United States Patent Office 3,050,783
Patented Aug. 28, 1962

3,050,783
PROCESS FOR STABILIZING VINYL CHLORIDE POLYMERS
Ernst Pirot, Wuppertal-Barmen, Germany, assignor to J. P. Bemberg Aktiengesellschaft, Wuppertal-Oberbarmen, Germany
No Drawing. Filed Mar. 21, 1960, Ser. No. 16,149
Claims priority, application Germany Mar. 20, 1959
10 Claims. (Cl. 18—57)

This invention relates to a process for the production of films of a vinyl chloride polymer, and more particularly, to a process in which such films can be extruded to obtain a product suitable for packaging foods.

Polyvinyl chloride or copolymers of vinyl chloride are generally extruded by means of a screw press or similar extruding device in order to produce a relatively thin film. The polymer is heated in the extruder and forced through an elongated slot or slit to form a flat sheet, tape, ribbon or the like. A tubular film is produced if the polymer is extruded through a rounded annular slot. With extrusion temperatures of about 135° C. to 190° C., there is a considerable decomposition of the polymer characterized by a splitting off of hydrogen chloride.

In order to avoid the adverse effect of high extrusion temperatures, it has been suggested that slipping agents or lubricants be added to the polymer to reduce the amount of decomposition. However, more favorable results have been obtained by the addition of stabilizers which retard the decomposition reaction. In addition, the stabilizers remain in the extruded product so as to stabilize the resulting film against the influence of heat and light.

It is known that the vinyl chloride polymers can be stabilized during and after extrusion by the addition of various metal soaps in combination with certain high-boiling epoxy compounds. Both of these ingredients have been considered essential to obtain the necessary stabilization of the polymer, especially under high extrusion temperatures. However, these ingredients remain in the polymer film after extrusion where they continue to act as stabilizers.

While the metal soaps are physiologically unobjectionable, the epoxy compounds and also their decomposition products are poisonous or at least exhibit a physiologically toxic effect. For this reason, the stabilized films of the prior art cannot be employed for the packaging of foods. A migratory action of the additives or stabilizers from the polymer into the foodstuff cannot be avoided, and the poisoning of the food makes it unfit for consumption. By adding only the metal soap as a stabilizer, it is generally impossible to avoid a noticeable decomposition of the polymer, and in addition, the quantity of the metal soap which would be required for a minimum stabilization is so great that the resulting film has an objectionable milky or cloudy appearance.

One object of the present invention is to provide an improved process for producing clear and stabilized films of a vinyl chloride polymer.

Another object of the invention is to provide a process for obtaining vinyl chloride films which are eminently suitable for the packaging of foodstuff.

Still another object of the invention is to provide a process for producing vinyl chloride films whereby the polymer is selectively stabilized during extrusion at high temperatures, and the toxic stabilizing ingredient then removed while retaining a non-toxic stabilizer for normal use of the resulting film.

These and other objects and advantages of the invention will become more apparent in view of the following detailed disclosure.

In accordance with the invention, it has now been found that vinyl chloride polymers can be extruded without noticeable decomposition and the filmaceous product can be employed as a food package by adding to the polymer prior to extrusion a mixture of a small amount of a metal soap and an epoxy compound having a boiling point below 190° C. and preferably a boiling point range of about 110° C. to 180° C. After extrusion, the resulting film is heated to a temperature above the boiling point of the epoxy compound so as to substantially completely separate the epoxy compound from the polymer.

The process of the invention is particularly suitable for the production of polyvinyl chloride films, but is also generally applicable to vinyl chloride copolymers with other mono-ethylenically unsaturated monomers such as vinyl acetate, vinylidene chloride, acrylic monomers and the like, preferably those copolymers containing at least 85% by weight of vinyl chloride. It will be understood that small amounts of up to about 5% by weight of any other monomer will not appreciably change the vinyl chloride properties, and such polymers will be recognized as consisting essentially of vinyl chloride.

As metal soap stabilizers, there are many known compounds which have been used for this purpose and the metal salts of fatty acids are most commonly employed. For the present invention, I prefer to employ the calcium, tin and zinc salts of fatty acids, especially the higher fatty acids containing about 8 to 18 carbon atoms. The metal soaps are added to the polymer in an amount of about 0.5 to 5%, preferably 1 to 3%, by weight of the polymer.

As low-boiling epoxy compounds, i.e. boiling below 190° C., especially effective results have been obtained with the class of compounds defined by the formula

wherein R represents hydrogen, a lower alkyl group such as methyl, ethyl or propyl, a lower alkylene group such as allyl, or the acetyl group $CH_3CO-$. The epoxy compound is added together with the metal soap stabilizer in a quantity of about 0.1 to 5%, preferably 0.5 to 3%, by weight with respect to the polymer. The following epoxy compounds, shown with their corresponding boiling points, can be used in accordance with the invention:

|  | ° C. | mm. |
|---|---|---|
| Glycidol | 65 | b 15 |
| Glycidol methyl ether | 115–119 | b 760 |
| Glycidol ethyl ether | 128 | b 760 |
| Glycidol acetate | 168–169 | b 760 |
| Glycidol allyl ether | 160–163 | b 760 |
| Glycidol ethyl ether | 161–163 | b 760 |

The stabilizing additives can be intimately mixed with the vinyl chloride polymer prior to extrusion, either by kneading or milling in a separate step or by addition directly to the extruder, for example at the beginning of a screw conveyor where the polymer is progressively heated just prior to the actual extrusion. After extrusion, the epoxy compound is completely evaporated from the extruded film by passing it through a heated shaft or similar drying chamber. It will be understood that excessively high drying temperatures will be avoided in order to prevent unnecessary damage to the film since temperatures just above the boiling point of the epoxy compound are sufficient to obtain a substantially complete removal, especially if the released vapors are periodically or continuously evacuated from the drying chamber. The non-toxic metal soaps remain in the polymer during evaporation and the finished product is thereby given a satisfactory resistance to heat and light for the normal food packaging uses of the film.

When ading the above-mentioned metal salt and epoxy stabilizers, especially good results are obtained in accordance with the invention if there is added at the same time a minor proportion with respect to the polymer of an inert organic solvent which is capable of dissolving the polymer only at elevated temperatures, i.e. at temperatures above normal or room temperatures which usually fall within a range of 15–30° C. The inert solvent is preferably employed in a quantity of less than 40%, preferably about 5 to 25%, by weight with respect to the polymer. At normal temperatures, the solvent should neither dissolve nor swell the polymer and should be sufficiently volatile to permit its extraction or evaporation together with the epoxy compound. At the same time, the solvent should be capable of dissolving the polymer at the extrusion temperatures, e.g. from 135° C. to about 190° C. Especially useful solvents are xylene, toluene, dioxane and mixtures thereof.

The term "extrusion" is employed herein to refer to the shaping, casting or blowing of the vinyl chloride polymer into a film. The term "film" is intended to include all foils, ribbons, sheets, tapes, tubes, and the like which are extruded to provide a relatively thin product by comparison to its two substantially elongated dimensions. The invention is particularly directed toward films or filmaceous coatings which are suitable for the packaging or wrapping of foods.

The invention is further illustrated but not restricted by the following examples wherein percentages and parts are

Example 1

Polyvinyl chloride as an emulsion polymer with a K-value of 65 is intimately mixed with 2.5% with respect to the polymer of the allyl ether of glycidol, also called allyl glycidyl ether and having the formula $$CH_2\!-\!\!\!-\!\!\!-\!CH\!-\!CH_2O\!-\!CH_2\!-\!CH\!=\!CH_2$$

The polymer is also mixed at the same time with 0.2% zinc octoate and 2% calcium ricinoleate. The resulting stabilized polyvinyl chloride is then extruded at a temperature of about 180° C. as a tubular foil or film having a thickness of 25–30 mμ. The volatile portion of the stabilizer, i.e. the allyl glycidyl ether, is then easily separated from the film in a drying chamber maintained at a temperature of 130–135° C.

The volatile epoxy compound is then recovered and reused as a stabilizer in the extrusion process.

Example 2

85 parts of polyvinyl chloride containing metal soaps and low-boiling epoxy compounds as stabilizers are introduced into a kneader together with 15 parts of a solvent consisting of 12 parts of xylene and 3 parts of toluene. The stabilized polyvinyl chloride itself contains 0.5% tin ricinoleate, 0.1% calcium ricinoleate, 0.1% zinc ricinoleate and 2% of the ethyl ether or glycidol having the formula

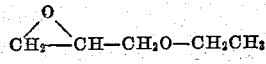

After intimate mixing or kneading at room temperature, the resulting composition is granulated at 100–110° C. and then blown at 160–170° C. in a continuous process to form a flat film. Alternatively, the granulated material can be cast from an extruder at 140–150° C. into a flat film. The resulting film is dried in a suitable shaft or drying tube at a temperature of 150–160° C.

The evaporated vapors from the drying tube are recovered and contain the glycidol ethyl ether in a quantitative amount together with the aromatic solvent. Any residue of the solvent in the film can be quantitatively separated by further drying either before or after cutting the film. Both of the evaporated components are collected and reused in the treatment of the polymer.

The resulting film retains only the metal soaps as stabilizers and exhibits a good resistance to heat and light for all practical purposes.

Example 3

A copolymer of 90% vinyl chloride and 10% vinyl acetate (K-value of 65) is stabilized with 0.7% tin ricinoleate, 0.1 zinc ricinoleate and 1% of the glycidol ester of acetic acid, also referred to as glycidol acetate and having the formula

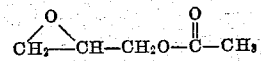

The stabilized copolymer is then worked up by intimately mixing or dispersion with 15% by weight thereof of a solvent consisting of 93% xylene and 7% dioxane, and then extruded as in Example 2.

The resulting films or foils, after separating the solvent and epoxy compound in the drying chamber, exhibit a high transparency and are stabilized against heat and light under normal exposure. The films contain no toxic ingredients and are therefore universally useful for packaging food products.

The present invention provides a method for producing a high quality film of vinyl chloride polymers which can be safely employed in the food industry. Such polymers have previously been neglected for this use because a good stabilization could not be obtained without a corresponding danger of contamination of foods in contact with the film. It will be understood, of course, that other non-toxic ingredients such as lubricants or coloring matter may be incorporated in the polymer without departing from the spirit or scope of the invention. Essentially, the method of the invention overcomes the existing prejudice against vinyl chloride polymers as food packaging films without sacrificing the quality of the film with regard to its transparency and stabilization.

The invention is hereby claimed as follows:

1. In a process for extruding a film of a vinyl chloride polymer stabilized with a metal soap, the steps which comprise adding to said polymer before extrusion the metal soap stabilizer together with an epoxy compound of the formula

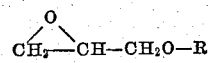

in which R is a member selected from the group consisting of hydrogen, lower alkyl, lower alkenyl and acetyl with a boiling point below 190° C., extruding the stabilized polymer into a film, and heating the extruded film to vaporize and substantially completely separate said epoxy compound from said polymer, said metal soap being retained in said polymer.

2. A process as claimed in claim 1 wherein the epoxy compound boils at a temperature between about 110° and 189° C.

3. A process as claimed in claim 1 wherein the amount of the epoxy compound added to the polymer is about 0.5 to 3% by weight with respect to the polymer.

4. A process as claimed in claim 1 wherein the polymer containing the stabilizer and epoxy compound is mixed prior to extrusion with an inert organic solvent capable of dissolving the polymer only at an elevated temperature.

5. A process as claimed in claim 1 wherein the polymer is polyvinyl chloride.

6. In a process for extruding a film of a vinyl chloride polymer of at least 85% by weight of vinyl chloride stabilized with a metal soap, the steps which comprise adding to said polymer prior to extrusion a mixture of from about 1 to 3% by weight of a metal soap selected from the group consisting of the calcium, tin and zinc salts of a fatty acid and from about 0.1 to 3% by weight of an epoxy compound of the formula

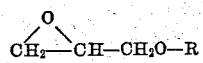

in which R is a member selected from the group consisting of hydrogen, lower alkyl, lower alkenyl and acetyl with a boiling point below 190° C., extruding the stabilized polymer into a film, and substantially completely separating said epoxy compound from said polymer by heating the extruded film at a temperature sufficiently high to vaporize said epoxy compound therefrom but sufficiently low to prevent substantial damage to said polymer and also to prevent substantial removal of said metal soap from said polymer.

7. A process as claimed in claim 6 wherein the stabilized polymer is mixed prior to extrusion with about 5 to 25% by weight thereof of a solvent selected from the group consisting of xylene, toluene, dioxane and mixtures thereof.

8. A process as claimed in claim 6 wherein the epoxy compound is the compound of the formula

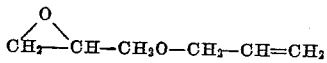

9. A process as claimed in claim 6 wherein the epoxy compound is the compound of the formula

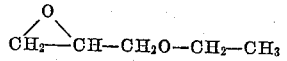

10. A process as claimed in claim 6 wherein the epoxy compound is the compound of the formula

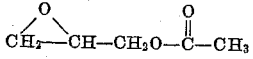

References Cited in the file of this patent

UNITED STATES PATENTS

| | | |
|---|---|---|
| 2,822,237 | Iwamae | Feb. 4, 1958 |
| 2,824,780 | Satterthwaite | Feb. 25, 1958 |
| 2,970,980 | Mack | Feb. 7, 1961 |

FOREIGN PATENTS

| | | |
|---|---|---|
| 571,202 | Canada | Feb. 24, 1959 |

OTHER REFERENCES

Parker: "Extrusion of Unplasticized PVC Film," from British Plastics, October 1959; pp. 456–459.

UNITED STATES PATENT OFFICE
CERTIFICATE OF CORRECTION

Patent No. 3,050,783            August 28, 1962

Ernst Pirot

It is hereby certified that error appears in the above numbered patent requiring correction and that the said Letters Patent should read as corrected below.

Column 3, line 27, after "are" insert -- by weight. --.

Signed and sealed this 15th day of January 1963.

(SEAL)
Attest:

ERNEST W. SWIDER
Attesting Officer

DAVID L. LADD
Commissioner of Patents